US006624756B1

United States Patent
Butterworth

(10) Patent No.: US 6,624,756 B1
(45) Date of Patent: Sep. 23, 2003

(54) LIQUID CRYSTAL LIGHT VALVE SYSTEM WITH AUTOMATIC COLOR BALANCE CORRECTION

(75) Inventor: Mark M. Butterworth, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/363,963

(22) Filed: Jul. 29, 1999

(51) Int. Cl.[7] ................................................. G08B 5/00
(52) U.S. Cl. ................... 340/815.4; 348/743; 348/742; 345/101; 345/94
(58) Field of Search .................. 340/815.4, 815.43, 340/815.56; 345/55, 205, 98, 87, 88, 89, 90, 91, 92, 93, 97, 102, 101, 94; 348/743, 742, 655, 658, 657, 656

(56) References Cited

U.S. PATENT DOCUMENTS

| | | | | |
|---|---|---|---|---|
| 5,337,068 A | * | 8/1994 | Stewart et al. | 345/88 |
| 5,428,408 A | * | 6/1995 | Stanton | 348/742 |
| 5,489,918 A | * | 2/1996 | Mosier | 345/89 |
| 5,528,318 A | * | 6/1996 | Janssen | 348/756 |
| 5,706,061 A | * | 1/1998 | Marshall et al. | 348/743 |
| 5,774,196 A | * | 6/1998 | Marshall | 348/743 |
| 5,917,558 A | * | 6/1999 | Stanton | 348/743 |
| 5,963,276 A | * | 10/1999 | Inbar | 349/5 |
| 5,967,636 A | * | 10/1999 | Stark et al. | 353/84 |
| 5,977,942 A | * | 11/1999 | Walker et al. | 345/97 |
| 6,140,983 A | * | 10/2000 | Quanrud | 345/55 |
| 6,519,012 B1 | * | 2/2003 | Helbing et al. | 349/30 |

* cited by examiner

Primary Examiner—Nina Tong

(57) ABSTRACT

A liquid crystal-based light valve system with automatic color correction. The invention includes a light input, a liquid crystal-based spatial light modulator, a light output, a light intensity sensor, and a color controller. The light intensity sensor is located along an optical path between the light input and the light output and is configured to detect the intensity of light illuminating the spatial light modulator. The color controller is electrically connected to the light intensity sensor. The color controller may be configured to modulate the light received at the light input. In addition, the spatial light modulator may include a pixellated electrode and control circuitry electrically connected to the pixellated electrode and the color controller. The invention may alternatively include a first, second, and third liquid crystal-based spatial light modulator, a color separator, and a first, second, and third light intensity sensor. The first, second, and third light intensity sensors are configured to detect the intensity of light illuminating the first, second, and third spatial light modulator, respectively. The color controller is electrically connected to each of the first, second, and third light intensity sensors.

11 Claims, 17 Drawing Sheets

LIQUID CRYSTAL LIGHT VALVE SYSTEM WITH AUTOMATIC COLOR BALANCE CORRECTION

FIELD OF THE INVENTION

The invention relates to liquid crystal-based light valve systems such as those used in color video displays and in particular relates to such light valve systems having automatic color correction.

BACKGROUND OF THE INVENTION

A need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. A need also exists for a replacement for the conventional cathode-ray tube used in many display devices including computer monitors, conventional and high-definition television receivers and large-screen displays. Both of these needs can be satisfied by display devices that incorporate a light valve system that uses as its light control element a spatial light modulator based on liquid crystal material.

Liquid crystal-based spatial light modulators are available in either a transmissive form or in a reflective form. The transmissive spatial light modulator is composed of a layer of a liquid crystal material sandwiched between two transparent electrodes. The liquid crystal material can be either ferroelectric or nematic type. One of the electrodes is segmented into an array of pixel electrodes to define the picture elements (pixels) of the transmissive spatial light modulator. The direction of an electric field applied between each pixel electrode and the other electrode determines whether or not the corresponding pixel of the transmissive spatial light modulator rotates the direction of polarization of light falling on the pixel. The transmissive spatial light modulator is constructed as a half-wave plate and rotates the direction of polarization through 90° so that the polarized light transmitted by the pixels of the spatial light modulator either passes through a polarization analyzer or is absorbed by the polarization analyzer, depending on the direction of the electric field applied to each pixel.

Reflective spatial light modulators are similar in construction to transmissive spatial light modulators, but use reflective pixel electrodes and have the advantage that they do not require a transparent substrate. Accordingly, reflective spatial light modulators can be built on a silicon substrate that also accommodates the drive circuits that derive the drive signals for the pixel electrodes from the input video signal. A reflective spatial light modulator has the advantage that its pixel electrode drive circuits do not partially occlude the light modulated by the pixel. This enables a reflective spatial light modulator to have a greater light throughput than a similar-sized transmissive spatial light modulator and allows larger and more sophisticated drive circuits to be incorporated.

As with the transmissive spatial light modulators, the direction of an electric field (in this case between the transparent electrode and the reflective electrode) determined whether or not the corresponding pixel of the reflective spatial light modulator rotates through 90° the direction of polarization of the light falling on (and reflected by) by the pixel. Thus, the polarized light reflected by the pixels of the reflective spatial light modulator either passes through a polarization analyzer or is absorbed by the polarization analyzer, depending on the direction of the electric field applied to each pixel.

The resulting optical characteristics of each pixel of both the transmissive and reflective spatial light modulators are binary: each pixel either transmits light (its 1 state) or absorbs light (its 0 state), and therefore appears light or dark, depending on the direction of the electric field.

To produce the grayscale required for conventional display devices, the apparent brightness of each pixel is varied by temporally modulating the light transmitted by each pixel. The light is modulated by defining a basic time period that will be called the illumination period of the spatial light modulator. The pixel electrode is driven by a drive signal that switches the pixel from its 1 state to its 0 state. The duration of the 1 state relative to the duration of the illumination period determines the apparent brightness of the pixel.

To produce color output required for conventional display devices, a single spatial light modulator may be used or multiple spatial light modulators may be used. In order to produce a color output from a single spatial light modulator, the spatial light modulator is illuminated sequentially with light of different colors, typically red, blue, and green. This sequential illumination may be accomplished using multiple light sources, each having one of the desired illumination colors, or by using a "white" light source with sequential color filtering. For purposes of this description a "white" light source is one that emits light over a broad portion of the visible light spectrum. In either case, each of the sequential colors is modulated individually by the spatial light modulator to produce three sequential single-color images. If the sequence of single-color images occur quickly enough, a viewer of the sequential single-color images will be unable to distinguish the sequential single-color images from a full-color image.

To produce color output using multiple spatial light modulators, each of the spatial light modulators is simultaneously illuminated with a different colored light. This can be accomplished using multiple light sources, each having one of the desired illumination colors, or by using a "white" light source with a color separator. Typically three spatial light modulators are used, one illuminated with red light, one with blue light, and one with green light. Each of the spatial light modulators modulates the colored light that illuminates it to form a single-colored image, and the single-colored images from each of the spatial light modulators are combined into a single full-color image.

FIG. 1A shows part of a display device incorporating a conventional transmissive light valve system 2 including a single transmissive spatial light modulator 4. Other principal components of the display device are the polarizer 6, the analyzer 8, and the color sequencer 9. The light valve system is illuminated with light from the "white" light source 10, the efficiency of which may be improved using a reflector 12 and collector optics 14 that concentrate the light towards the polarizer 6. The light output by the light valve system passes to the output optics 16 that focus the light to form an image (not shown). The light valve system, light source (including reflector and collector optics) and output optics may be incorporated into various types of display device, including miniature, wearable devices, cathode-ray tube replacements, and projection displays.

Light generated by the light source 10 passes through the polarizer 6. The polarizer polarizes the light output from the light source. The polarized light is then transmitted to the color sequencer 9. The color sequencer, allows only a portion of the light in a particular color waveband to pass, filtering the remaining wavelengths of light.

FIG. 1B is a front view of the particular type of color sequencer shown in FIG. 1A. This type of color sequencer 9 is a wheel 18 that can spin around a pivot 20 driven by a stepper motor 22. The wheel includes several filter windows 24 that allow only a particular waveband of light to pass, blocking the remaining light. Blue, Green and Red filer windows are depicted that allow only a blue, a green, or a red waveband of light, respectively, to pass. A color sequence controller 26 is connected to the stepper motor. The controller 26 directs the stepper motor to rotate the wheel around the pivot in the direction indicated by arrow 28, to stop the wheel when the next window 24 is aligned with the spatial light modulator 4, and to begin rotation again after a given period of time has elapsed. Thus, the spatial light modulator is illuminated sequentially with polarized light that is in a blue waveband, a green waveband, and a red waveband.

The spatial light modulator 4 is divided into a two-dimensional array of picture elements (pixels) 30 that define the spatial resolution of the light valve system. The direction of an electric field in each pixel of the spatial light modulator 12 determines whether or not the direction of polarization of the light reflected by the pixel is rotated by 90° relative to the direction of polarization of the incident light. A substantially reduced number of pixels 30 are shown to simplify the drawing. For example, in a light valve system for use in a large-screen computer monitor, the reflective electrode could be divided into a two-dimensional array of 1600×1200 pixel electrodes.

Referring back to FIG. 1A, the light transmitted by each pixel 30 of the spatial light modulator passes to the analyzer 8 and is output from the light valve system 2 depending on whether or not its direction of polarization was rotated by the spatial light modulator. The light output from the light valve system 2 passes to the output optics 16 to form an image (not shown). The image will consist of green pixels if the color sequencer 9 is in the position shown in FIG. 1B. The following two images output by the light valve system 2 will consist of blue pixels and red pixels, respectively. If these images occur quickly enough in sequence, a viewer will see what appears to be a full color image.

FIG. 2 depicts part of a prior art display device incorporating a conventional reflective light valve system 39 including a single reflective spatial light modulator 40. It is noted that throughout the following description, elements that are identical to elements previously described are indicated by like reference numerals and will not be described again. The reflective light valve system 39 operates in essentially the same manner as the transmissive light valve system 2, except that the light transmitted by the color sequencer 9 is reflected by the spatial light modulator 40 rather than being transmitted through it. The reflective spatial light modulator 40 is similar to the previously described transmissive spatial light modulator 4 inasmuch as it is divided into a two-dimensional array of picture elements (pixels) 30 that define the spatial resolution of the light valve system 39. In addition, the direction of an electric field in each pixel of the reflective spatial light modulator 40 determines whether or not the direction of polarization of the light reflected by the spatial light modulator 40 at that pixel is rotated by 90° relative to the direction of polarization of the incident light.

In the configuration depicted in FIG. 2, the reflective light valve system 39 is configured with the light from the light source 10 illuminating the reflective spatial light modulator 40 at an incident angle φ from the perpendicular. The light reflected from the spatial light modulator is also reflected at an angle φ from the perpendicular in a direction opposite that of the incident light. Thus, the angle between the light illuminating the spatial light modulator and the light reflected from the spatial light modulator is equal to 2φ. This angle allows the light reflected from the spatial light modulator 40 to transmit unobstructed to the analyzer 8 and allows for a compact overall design.

FIG. 3 depicts part of another prior art display device that, like the device shown in FIG. 2, incorporates a conventional reflective light valve system 39 including a single reflective spatial light modulator 40. This display device is distinct from those previously described inasmuch as it utilizes a beam splitter 44. The beam splitter reflects the light from the light source 10 towards the reflective spatial light modulator 40 after it has been polarized by polarizer 6. At the same time, the beam splitter function to transmit the light reflected from the reflective spatial light modulator towards the analyzer 8. Alternatively, the components could be rearranged (not shown) so that the beam splitter transmits light from the light source towards the reflective spatial light modulator while reflecting the light reflected from the spatial light modulator towards the analyzer.

Using a beam splitter in the manner described offers the advantage that the spatial light modulator 40 can be illuminated from, and reflect light along a path perpendicular to the spatial light modulator. This eliminates any distortion that may result from illuminating the reflective spatial light modulator from an angle φ as shown in FIG. 2.

FIGS. 4, 5, and 6 depict part of prior art display devices similar to those shown in FIGS. 1A, 2, and 3, respectively. The primary difference between the later Figures and the former is that each of the later includes a tri-color light source 32 instead of the color sequencer 9 and white light source 10. The tri-color light source typically includes a red light emitting diode (LED) 34, a blue LED 36, and a green LED 38 although other red, blue, and green light-emitting devices whose output can be rapidly modulated may be used as the tri-color light source.

When the light valve system is operated in each of FIGS. 4–6, the red, blue and green LEDs sequentially illuminate the spatial light modulator 4, 40. The light transmitted or reflected by the pixels 30 pass to the analyzer 8 and is output from the light valve system 2, 39 depending on whether or not its direction of polarization was rotated by pixel of the spatial light modulator. The light output from the light valve system passes to the output optics 16 to form an image (not shown). This image will consist of blue, green, or red pixels when the blue LED 36, green LED 38, or red LED 34, respectively, illuminates the spatial light modulator. If these images occur quickly enough in sequence, a viewer will see what appears to be a full color image.

FIGS. 7–9 each depict part of a prior art display device incorporating a conventional triple reflective light valve system 46 that includes three reflective spatial light modulators 40. Each of the triple reflective light valve systems depicted operates in a similar manner to the display devices previously described. First, the light valve system 46 is illuminated with light from the "white" light source 10, the efficiency of which may be improved using a reflector 12 and collector optics 14 that concentrate the light towards the polarizer 6. The polarized light is then reflected by the beam splitter 44 towards a color separator.

In FIG. 7, the color separator is a series of three dichroic plates 48, 50, and 52, each having an associated reflective spatial light modulator 40. Each of the dichroic plates is configured to reflect light in a band of wavelengths (colorband) particular to that dichroic plate and to pass the remaining wavelengths of light. Thus, a particular portion of the color spectrum from the light generated by the "white" light source 10 may be reflected by each dichroic plate towards its associated reflective spatial light modulator 40 simultaneously. This eliminates the need for the previously described sequential illumination, and improves the perceived brightness of the color pixels passing through the analyzer 8.

For example, the dichroic plate 48 nearest the beam splitter 44 might reflect red-colored light toward its associated spatial light modulator 40 while the center dichroic plate 50 reflects green-colored light toward its associated spatial light modulator and the remote dichroic plate 52 farthest from the beam splitter reflects blue-colored light towards its spatial light modulator. When the light source 10 is ON, as shown, the colored light reflected by the dichroic plates passes to each of the three reflective spatial light modulators 40. Each of the three reflective spatial light modulators is capable of reflecting pixels of the colored light back at its associated dichroic plate in a manner consistent with the above description of the operation of the reflective spatial light modulator.

The pixellated light reflected by each of the spatial light modulators 40 will consist entirely of wavelengths in the colorband first reflected by the associated dichroic plate. Thus, the vast majority of the pixellated light reflected by each spatial light modulator 40 will be reflected by its associated dichroic plate 48, 50, 52 back toward the beam splitter 44. The beam splitter transmits this pixellated light towards the analyzer 8 and is output from the light valve system 46 depending on whether or not its direction of polarization was rotated by the spatial light modulator. The light output from the light valve system 46 passes to the output optics 16 to form an image (not shown). This image will be a color image consisting of a combination of the red, blue and green colored pixels from all three spatial light modulators that pass through the analyzer.

In FIG. 8 the color separator is a color separation cube 54, sometimes known as an x-cube or crossed-dichroic cube. As with the three dichroic plates depicted in FIG. 7, the color separation cube separates three distinct colorbands from the "white" light created by light source 10 and directs each of the colorbands to a particular spatial light modulator 40. The color separation cube 54 also recombines the light reflected from each of the spatial light modulators 40 and directs the combined light toward the analyzer beam splitter 44. The use of a color separation cube allows for a more compact design utilizing three spatial light modulators than can be achieved using three separate dichroic plates 48, 50, 52.

In FIG. 9, the color separator is a three-prism color separator 56 (sometimes known as a Philips cube or Philips prism). The design and use of a three-prism color separator is described in detail in U.S. Pat. No. 5,644,432, the contents of which are incorporated herein by reference. Like the previously described color separators, the three-prism color separator separates three distinct colorbands from the "white" light created by light source 10 and directs each of the colorbands to a particular spatial light modulator 40. The three-prism color separator 56 also recombines the light reflected from each of the spatial light modulators 40 and directs the combined light toward the beam splitter 44. The three-prism color separator has the advantage over the three dichroic plates 48, 50, 52 and the color separation cube 54 since it typically does a better job of recombining the reflected light from each of the spatial light modulators into a single color image the color separator consists of three dichroic plates 42, 43, and 44.

In each of the previously described light valve systems, maintaining an appropriate balance between each of the three color (red, blue and green) pixellated images is critical to the accurate reproduction of colors in the displayed image. The task of maintaining an appropriate color balance can be a difficult problem since the characteristics of the light illuminating the light valve system can change over time. For example, the "white" light source 10 depicted in FIGS. 1A, 2, 3, and 7–9 can often have optical characteristics that change with operating conditions. Operating conditions include items such as operating temperature, operating voltage, age of the light source, contamination, etc. Similarly, the light output by tri-color light sources 32 like those shown in FIGS. 4–6 can vary with operating condition, although the changes are not normally as pronounced as with the "white" light source 10.

The color balance of light valve system is typically set by the manufacturer with a setting that is appropriate for a new bulb at full operating temperature. These factory setting may be made during a testing procedure to compensate for variations in individual components, or may be pre-set at some level that is appropriate in most cases. Often, color balance during warmup and as the light source ages tends to suffer. As a result, the control circuitry for the light valve system will often allow a user to manually adjust color balance setting in order to compensate for these changing operating conditions.

Factory settings and manual adjustment of color balance, however, do not offer the dynamic minute to minute adjustment of color balance that may be appropriate, especially during warmup. Consequently, what is needed a light valve system with automatic color balance detection and correction.

SUMMARY OF THE INVENTION

The invention provides a liquid crystal-based light valve system with automatic color correction. The light valve system includes a light input, a liquid crystal-based spatial light modulator, a light output, a light intensity sensor, and a color controller. The light input is the portion of the light valve system through which light is received. The light output is the portion of the light valve system through which the light received at the light input is output after modulation by the spatial light modulator. The light intensity sensor is located along an optical path between the light input and the light output and is configured to detect the intensity of light illuminating the spatial light modulator. The color controller is electrically connected to the light intensity sensor. The color controller may be configured to modulate the light received at the light input. In addition, the spatial light modulator may include a pixellated electrode and control circuitry electrically connected to the pixellated electrode and the color controller.

The light valve system may further include a color sequencer located along the optical path. The color sequencer includes a sequencer input, a sequencer output, and an electrical connection to the color controller. The sequencer input is the portion of the color sequencer through which the light received at the light input and including a first, a second, and a third colorband is received. The sequencer output is the portion of the color sequencer through which each of the first, the second, and the third colorbands sequentially pass for a first, a second, and a third duration, respectively. The electrical connection allows the color controller to control at least one of the first, the second, and the third duration. The color sequencer may be located either along a first portion of the optical path, between the light input and the spatial light modulator, or along a second portion of the optical path, between the spatial light modulator and the light output.

The light intensity sensor previously described may alternatively be part of the liquid crystal-based spatial light modulator itself and may be configured to detect the intensity of light illuminating the pixellated electrode.

Alternatively, the liquid crystal-based light valve system with automatic color correction, according to the invention, includes a light input, a first, second, and third liquid crystal-based spatial light modulator, a color separator, a light output, a first, second, and third light intensity sensor, and a color controller. The light input is the portion of the light valve system through which light including a first, second, and third colorband is received. The color separator is configured to direct the first, second, and third colorbands to the first, second, and third spatial light modulators, respectively. The light output is the portion of the light valve system through which the light received at the light input and modulated by one of the first, second, and third spatial light modulators is output. The first, second, and third light intensity sensors are located along an optical path between the color separator and the light output and are configured to detect the intensity of light illuminating the first, second, and third spatial light modulator, respectively. The color controller is electrically connected to each of the first, second, and third light intensity sensors.

Each of the first, second, and third spatial light modulators may include a pixellated electrode and control circuitry electrically connected to the pixellated electrode and the color controller. In addition, the first, second, and third light intensity sensors may be located on a first portion of the optical path, between the color separator and the first, second, and third spatial light modulator, respectively. Alternatively, the first, second, and third light intensity sensors may be part of the first, second, and third spatial light modulator, respective, and configured to detect the intensity of light illuminating the respective pixellated electrode.

Accordingly, the light valve system according to the invention has automatic color balance detection and correction. Other features and advantages of the present invention will become apparent from the following detailed description, taken in conjunction with the accompanying drawings, illustrating, by way of example, the principles of the invention.

DETAILED DESCRIPTION OF THE INVENTION

The invention is based, in part, on the concept that a light intensity sensor can be utilized within a liquid crystal-based light valve system to determine the relative intensity of each colorband of light that illuminates a liquid crystal-based spatial light modulator. The light intensity information can then be used to adjust the color balance of the image output by the light valve system.

Figure 1A:
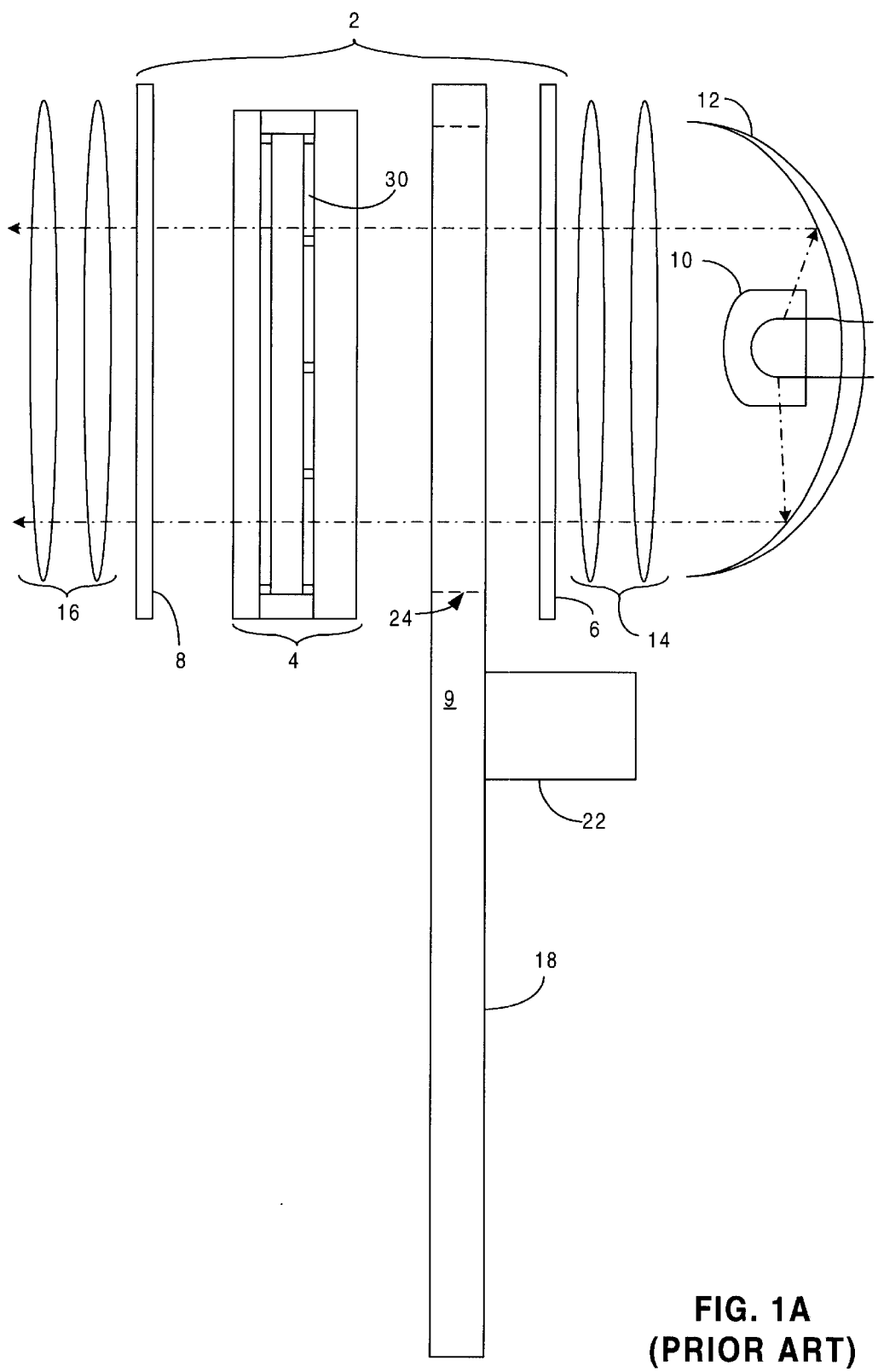
FIG. 1A is a schematic diagram of part of a prior art display device incorporating a conventional transmissive light valve system with a single spatial light modulator.
Figure 1B:
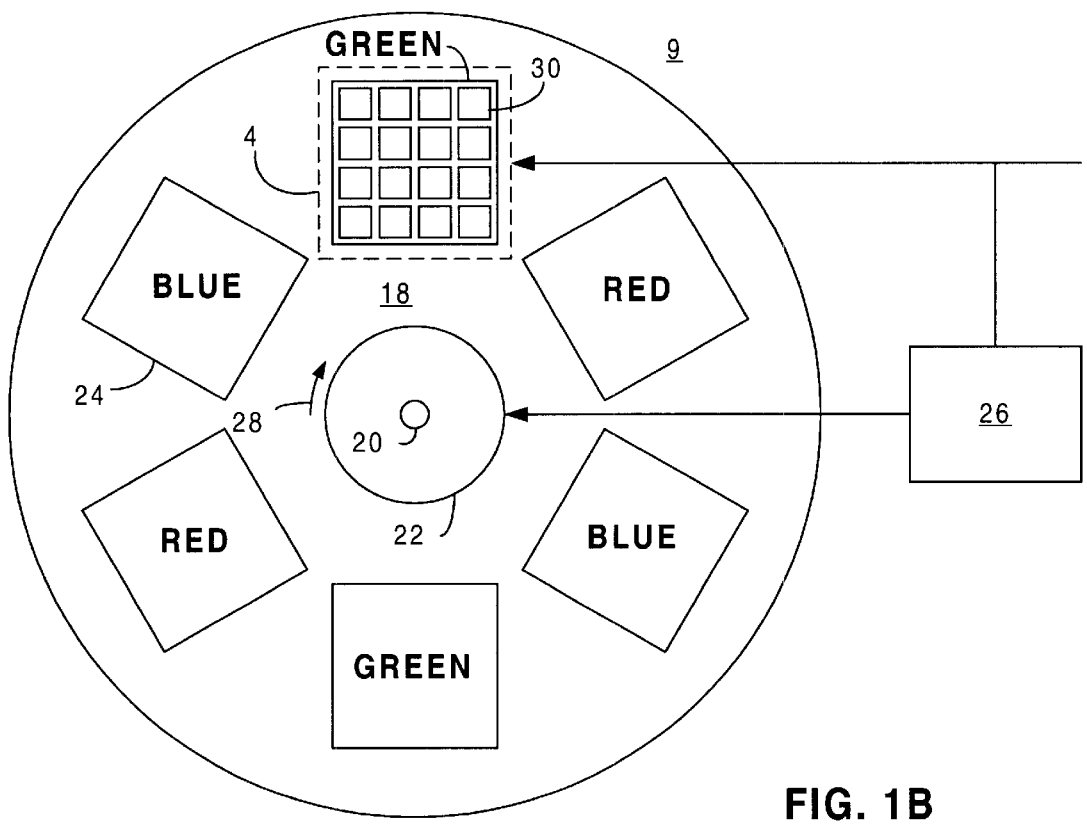
FIG. 1B is a front view of a color sequencer like that depicted in FIG. 1A.
Figure 10:
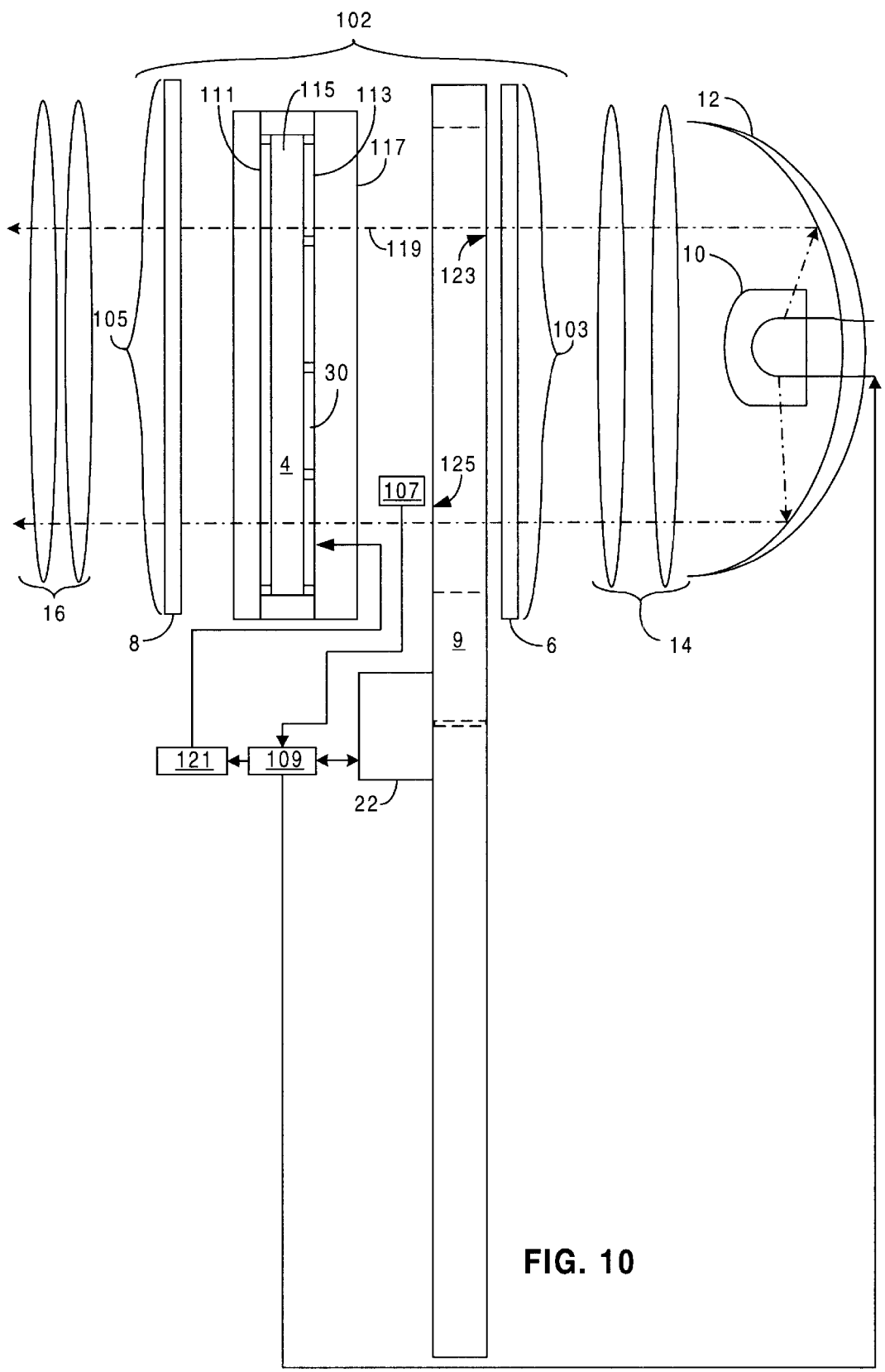
FIG. 10 is a schematic diagram of part of a display device incorporating a transmissive light valve system with a single spatial light modulator and automatic color correction according to a first embodiment of the invention.

FIG. 10 is a schematic diagram showing apart of a display device incorporating a first preferred embodiment of a liquid crystal-based light valve system with automatic color balance correction according to the invention 102. This embodiment includes elements that are similar to elements shown in prior art FIG. 1A including a transmissive liquid crystal-based spatial light modulator 4 and a color sequencer 9. It is noted that throughout the following detailed description, elements that are identical to elements previously described are indicated by like reference numerals and will not be described again.

The light valve system 102 according to the invention includes a light input 103, a liquid crystal-based spatial light modulator 4, a light output 105, a light intensity sensor 107, and a color controller 109. The light input 103 is the portion of the light valve system 102 through which light is received, typically after having be generated by a light source 10 and concentrated towards the light input by a reflector 12 and collector optics 14. The light received at the light input 103 may then be polarized by a polarizer 6. While the polarizer 6 is depicted as part of the light valve system 102, other alternatives are possible. For example, the light received at the light input 103 may already be polarized such as when the light source 10 is a polarizing light source, or when a polarizer is located between the light source 10 and the collector optics 14. What is critical is that light illuminating the spatial light modulator 4 be polarized.

The spatial light modulator 4 depicted is a transmissive liquid crystal-based spatial light modulator. Liquid crystal-based spatial light modulators are known in the art and typically include a transparent electrode 111, a pixellated electrode 113, and a layer of liquid crystal material 115 sandwiched between the transparent electrode and the pixellated electrode. The pixellated electrode 113 is divided into a two-dimensional array of pixel electrodes that define the pixels 30 of the spatial light modulator. A substantially reduced number of pixel electrodes is shown to simplify the drawing. For example, in a light valve system for use in a large-screen computer monitor, the reflective electrode could be divided into a two-dimensional array of 1600×1200 pixel electrodes. In transmissive spatial light modulators 4 the pixellated electrode 113 is transparent and is formed on the surface of a substrate 117 that is also transparent. In reflective spatial light modulators 40 (not shown this figure), the pixellated electrode 113 is reflective and is typically formed on the surface of a substrate 117 of silicon.

The pixellated electrode 113 is electrically connected to control circuitry 121 that can control the direction of an electric field applied to each of the pixels 30. The control circuitry is often located remote from the spatial light modulator 4 in the case of a transparent substrate in order to minimize interference with the light transmittance of the spatial light modulator. On the other hand, the control circuitry is often integrated into the silicon substrate in reflective spatial light modulators 40.

The light output 105 is the portion of the light valve system 102 through which the light received at the light input 103 is output after modulation by the spatial light modulator 4. The light output is typically located just following the analyzer 8 although other alternatives are possible. For example, an analyzer could be located on the opposite side of the imaging optics 16 from the light valve system 102.

The color sequencer 9 is located along an optical path 119 between the light input 103 and the light output 105. It includes a sequencer input 123 and a sequencer output 125. The sequencer input 123 is the portion of the color sequencer through which the light received at the light input 103, that includes at least a first, second, and third colorband, is received by the color sequencer. The sequencer output 125 is the portion of the color sequencer through which each of the first, second, and third colorband sequentially pass for a first, second, and third duration, respectively. The color sequencer 9 is preferably located on a first portion of the optical path 119 between the light input 103 and the spatial light modulator 4. Alternatively, the color sequencer may be located on a second portion of the optical path between the spatial light modulator and the light output 105.

The light intensity sensor 107 is located along an optical path 119 between the light input 103 and the light output 105 and is configured to detect an intensity of light illuminating the spatial light modulator 4. Detecting the intensity of light illuminating the spatial light modulator may be a direct measurement of the light illuminating the spatial light modulator. Alternatively, detecting the intensity of light illuminating the spatial light modulator may be the measurement of the intensity of light at some point along the optical path (such as between the spatial light modulator and the light output) where the intensity of light is proportional to the intensity of light illuminating the spatial light modulator. In order to best control color balance, however, it is preferable that the light intensity sensor be located along the optical path at a point after the sequencer output 125. Light intensity sensors are known in the art and include devices such as photo-diodes and photo-resistors.

The color controller 109 is electrically connected to the light intensity sensor. The color controller reconfigures the light valve system to restore color balance based on light intensity data gathered by the light intensity sensors 107. In this embodiment of the invention, the color controller may automatically restore color balance in the light valve system by controlling one or more of the light source 10 intensity, the color sequencer 9 timing, and the modulation of the spatial light modulator 4.

Figure 4:
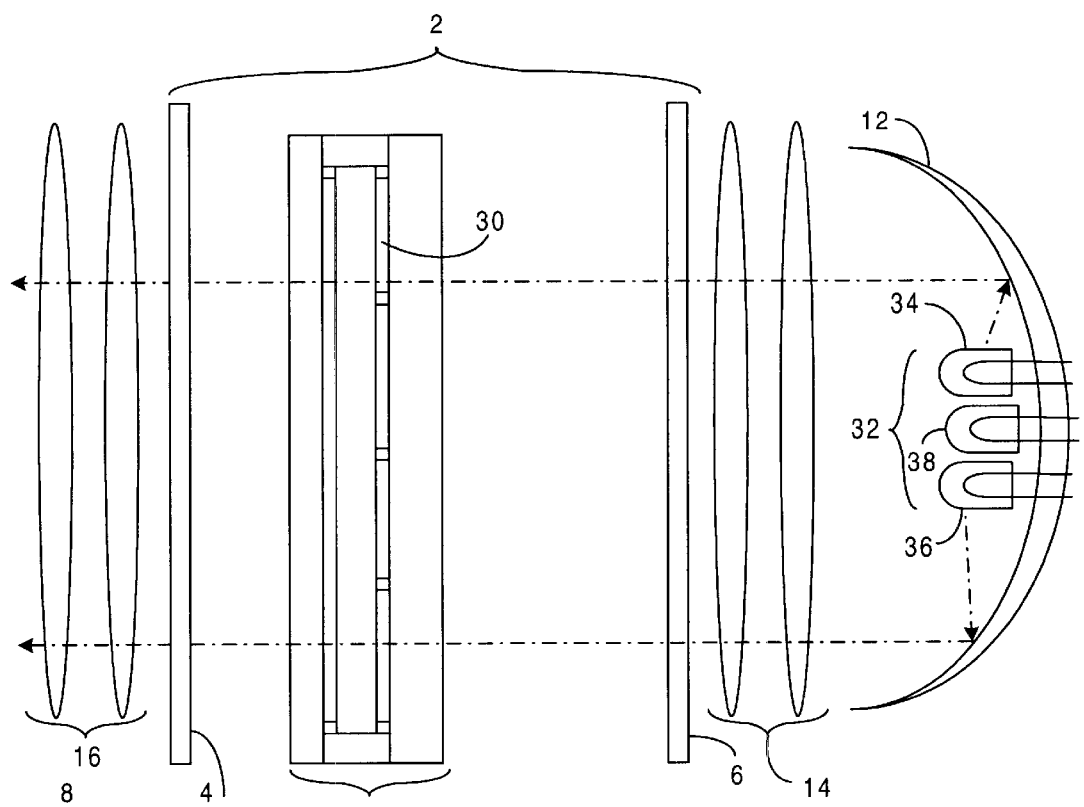
FIG. 4 is a schematic diagram of a part of a prior art display device incorporating a conventional transmissive light valve system with a single spatial light modulator and a tri-colored light source.
Figure 5:
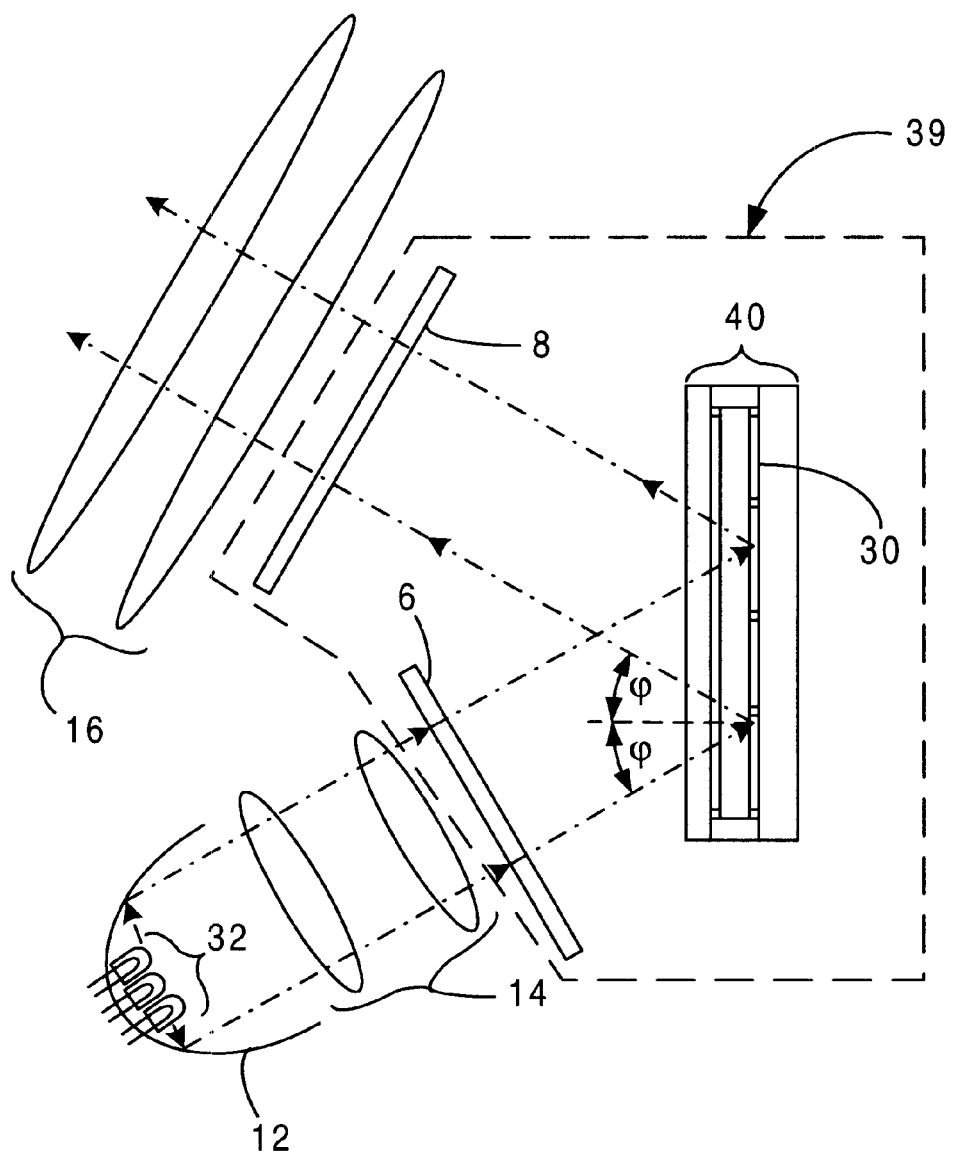
FIG. 5 is a schematic diagram of a part of a prior art display device incorporating a conventional reflective light valve system with a single spatial light modulator and a tri-colored light source.
Figure 6:
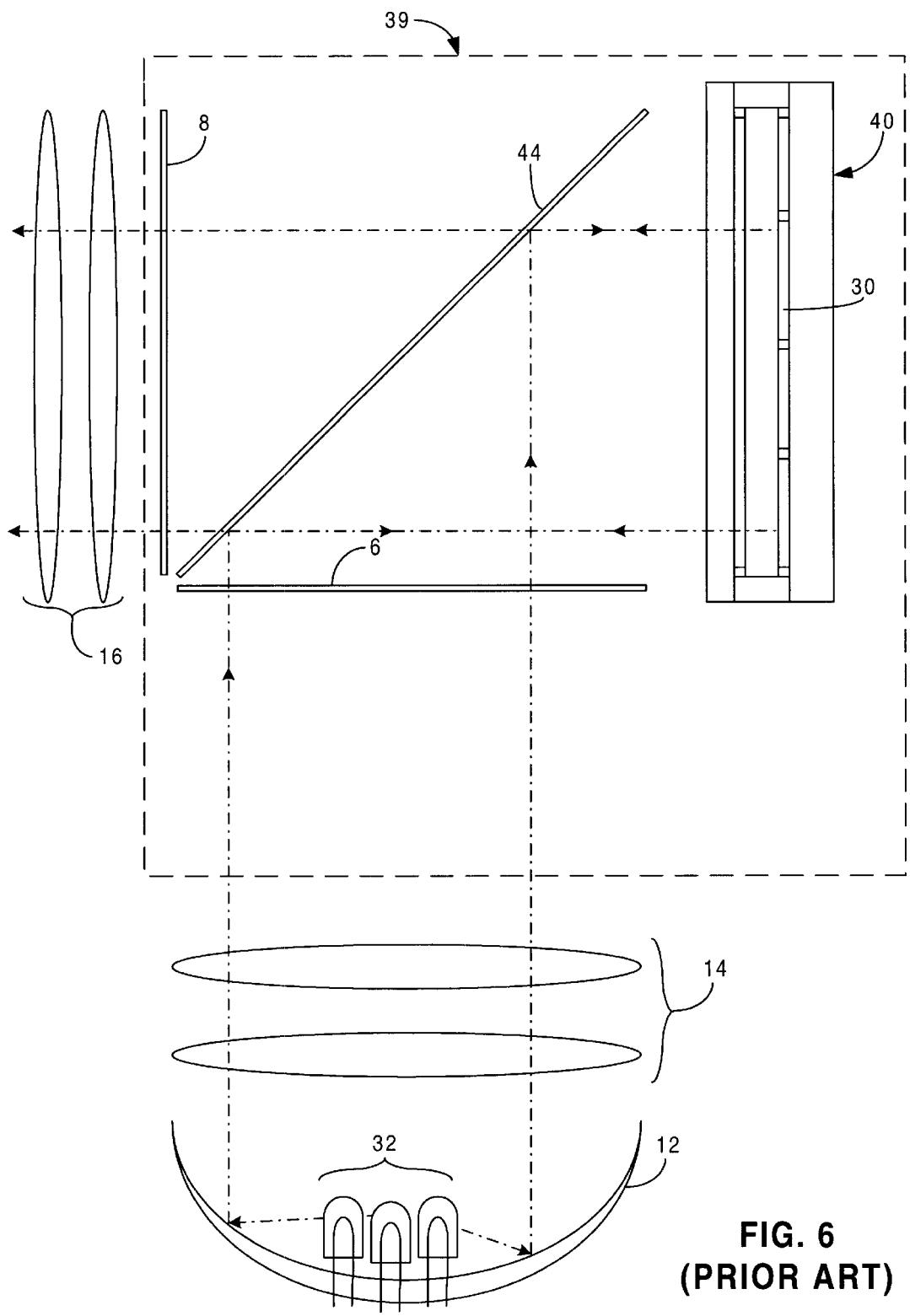
FIG. 6 is a schematic diagram of a part of a prior art display device incorporating a conventional transmissive light valve system with a single spatial light modulator, a beam splitter, and a tri-colored light source.

If light source intensity is controlled, the output of the light source 10 can be modulated (such as by reducing its voltage level) during the times when the color sequencer 9 is transmitting a particular colorband that has an intensity too high for proper color balance. Alternatively, the color controller may control a tri-colored light source (similar to that shown in prior art FIG. 4) if it is used instead of the "white" light source 10 and the color sequencer 9. In such a case, the color controller could modulate one or more of these colored light sources to achieve color balance.

If the timing of the color sequencer 9 is controlled, the color sequencer is electrically connected to the color controller 109 so that the color controller can reduce the duration of at least one of the first, second, and third colorband having too much intensity for proper color balance. Alternatively, the color controller can increase the duration of at least one of the first, second, and third colorband having too little intensity for proper color balance.

If the modulation of the spatial light modulator 4 is controlled, the color controller is electrically connected to the control circuitry 121 so the spatial light modulator can be adjusted to produce a brighter "grayscale" pixellated image when it is illuminated with light in a colorband having too little intensity for proper color balance. Alternatively, the spatial light modulator can be adjusted to produce a darker "grayscale" pixellated image when it is illuminated with light in a colorband having too much intensity for proper color balance.

Figure 2:
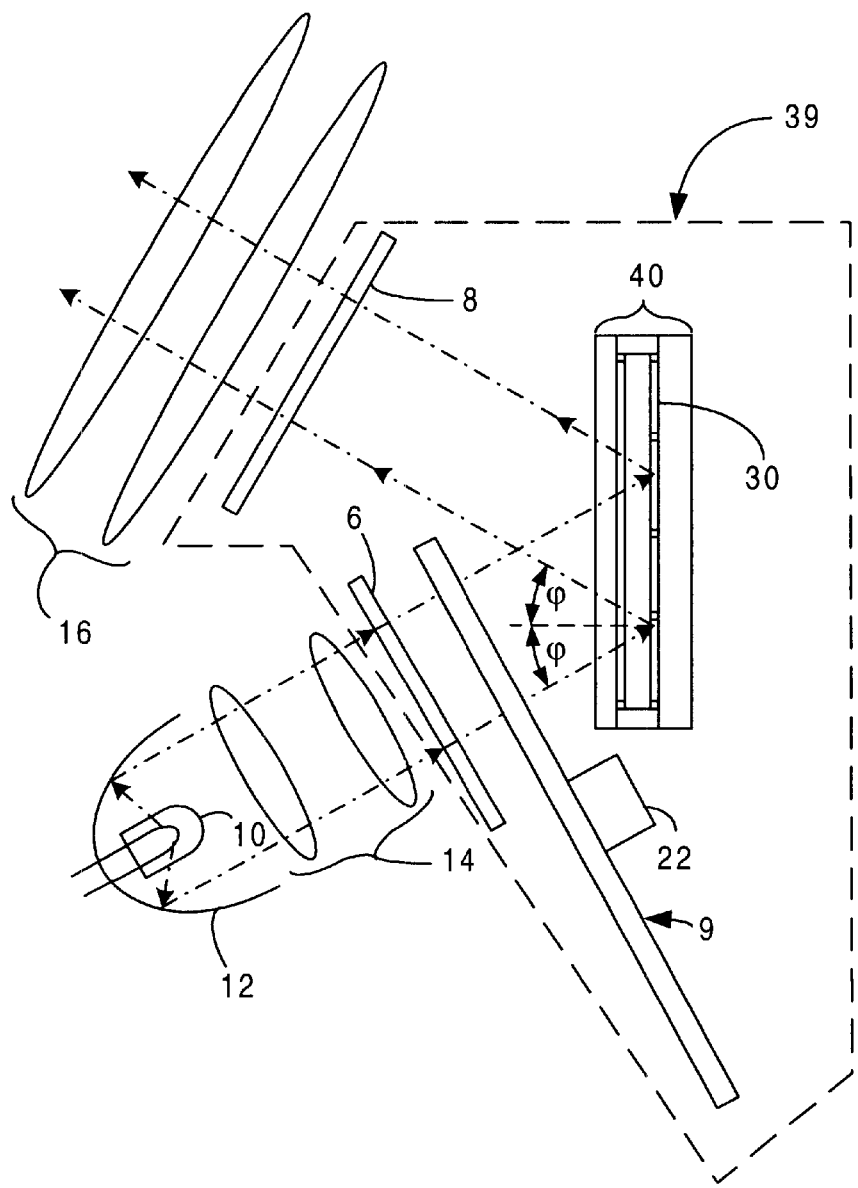
FIG. 2 is a schematic diagram of a part of a prior art display device incorporating a conventional reflective light valve system with a single spatial light modulator.
Figure 11:
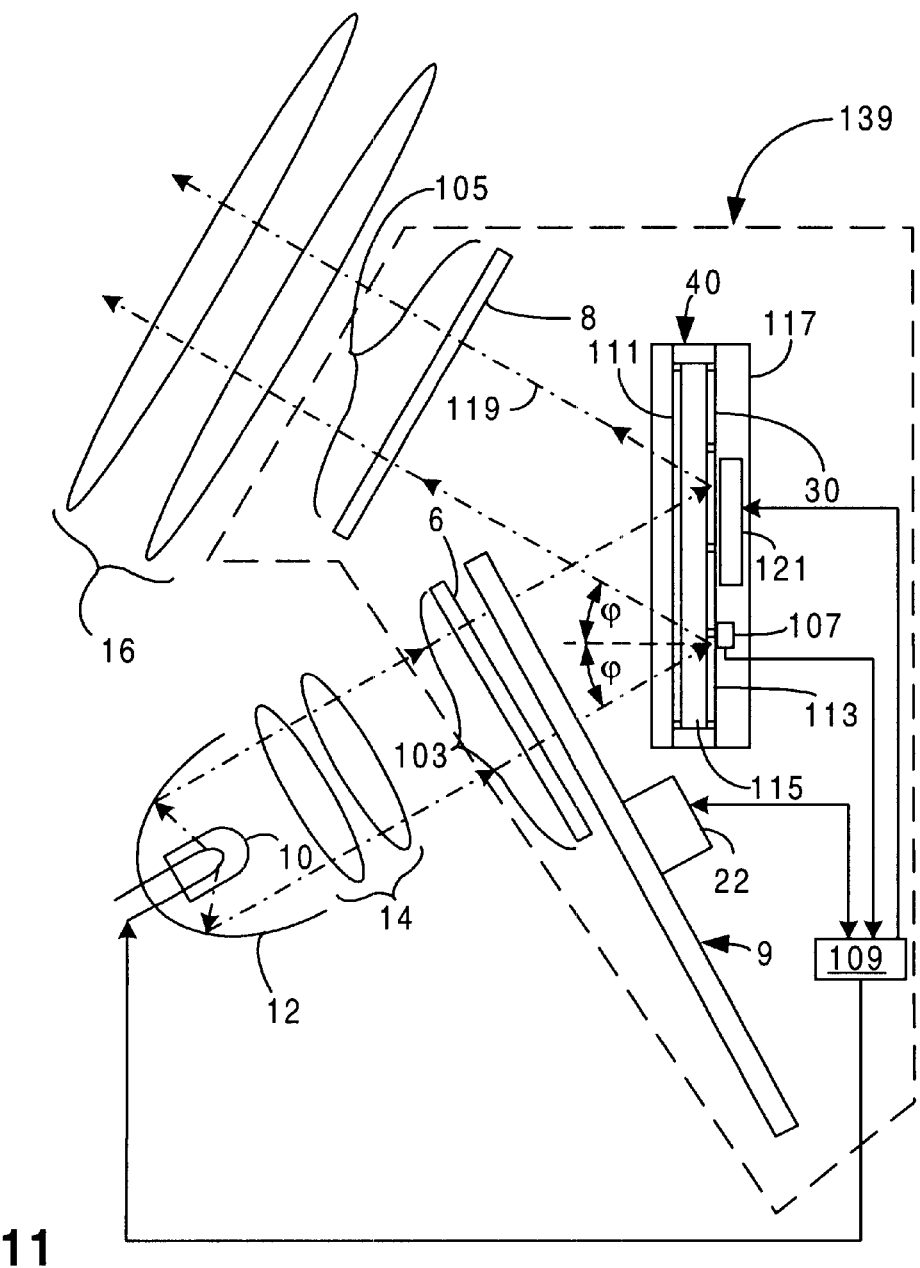
FIG. 11 is a schematic diagram of part of a display device incorporating a reflective light valve system with a single spatial light modulator and automatic color correction according to a second embodiment of the invention.

FIG. 11 is a schematic diagram showing a part of a display device incorporating a second preferred embodiment of a liquid crystal-based light valve system with automatic color balance correction according to the invention 139. This embodiment includes elements that are similar to elements shown in prior art FIG. 2 including a reflective liquid crystal-based spatial light modulator 40 and a color sequencer 9. In addition, like the previously described embodiment, the light valve system 139 includes a light input 103, a light output 105, and a color controller 109.

The spatial light modulator 40 is a reflective liquid crystal-based spatial light modulator with a reflective pixellated electrode 113 formed on the surface of a substrate 117. The substrate is preferably made of silicon or some other semiconductor in which integrated circuitry can be formed using techniques well known in the art. Thus, the control circuitry 121 may be formed within the substrate 117. Similarly, one or more light intensity sensors 107 may also be formed on the surface of the substrate along with the pixellated electrode 113. While not shown, it would also be possible to include the color controller 109 within the substrate 117.

Figure 12:
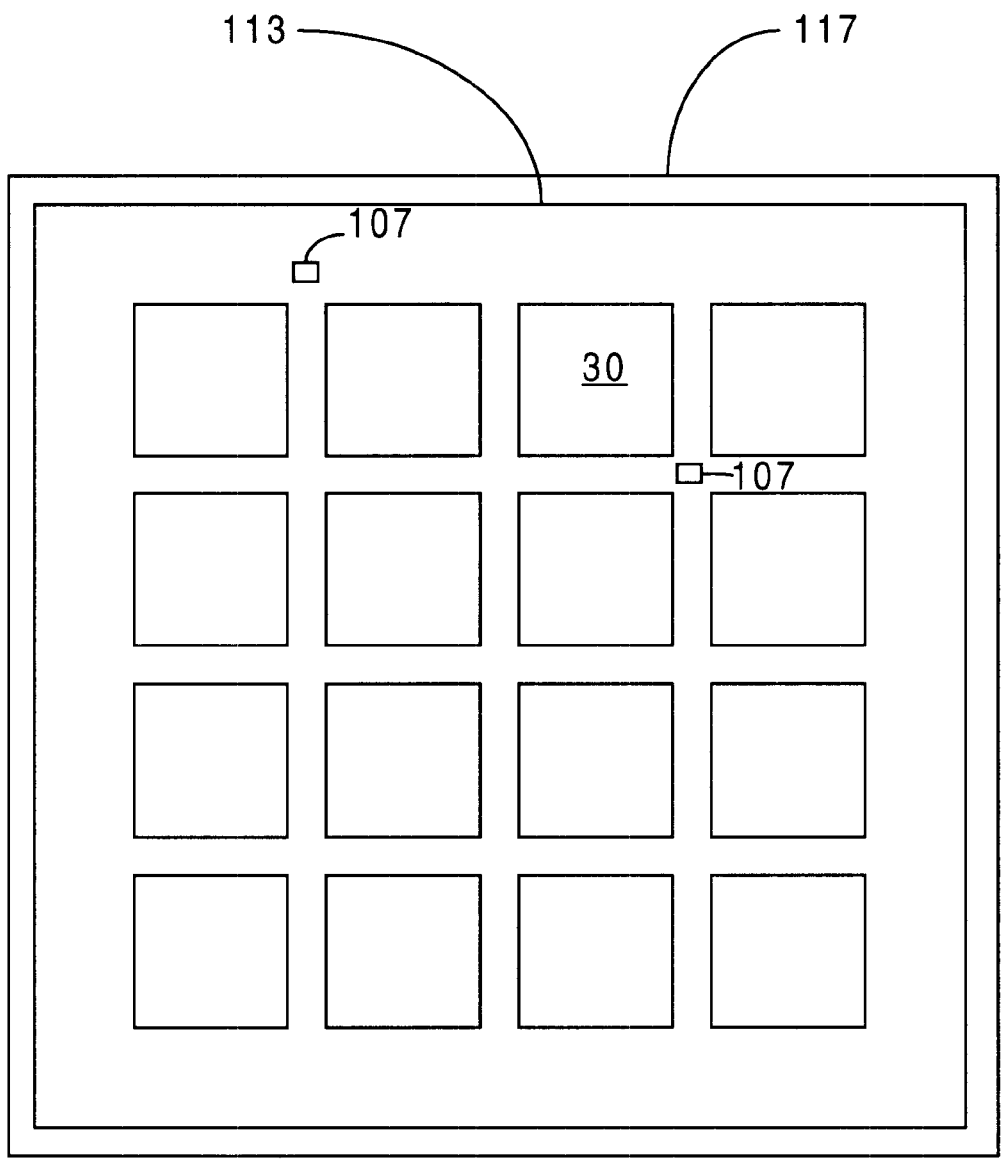
FIG. 12 is a front view of the substrate of a spatial light modulator including the pixellated electrode and light intensity sensors.

FIG. 12 is a front view of the pixellated electrode 113 formed on the substrate 117 as it would be viewed through the transparent electrode 111 and the liquid crystal material 115. By forming the light intensity sensors 107 on the surface of the substrate and in close proximity to the pixels 30 several advantages are achieved. First, the light intensity sensors can provide more accurate results because of their proximity to the pixels. Second, standard integrated circuit techniques allow the manufacture of the light intensity sensors 107 at a very low cost. Since no addition mountings are needed for a separate light intensity sensor 107, this reduces the cost even further. Third, the low cost and very small sizes which can be achieved with standard integrated circuit techniques make it possible to include multiple light intensity sensors on a single substrate for improved accuracy. In fact while unnecessary, it would be possible to have an individual light intensity sensor adjacent to each pixel 30.

As with the first preferred embodiment of the invention 102, the color controller 109 is electrically connected to the light intensity sensor 107. The color controller reconfigures the light valve system to restore color balance based on light intensity data gathered by the light intensity sensors 107. The color controller may automatically restore color balance in the light valve system by controlling one or more of the light source 10 intensity, the color sequencer 9 timing, and the modulation of the spatial light modulator 40. Alternatively, the color controller could control the modulation of a tri-colored light source 32, if used.

Figure 3:
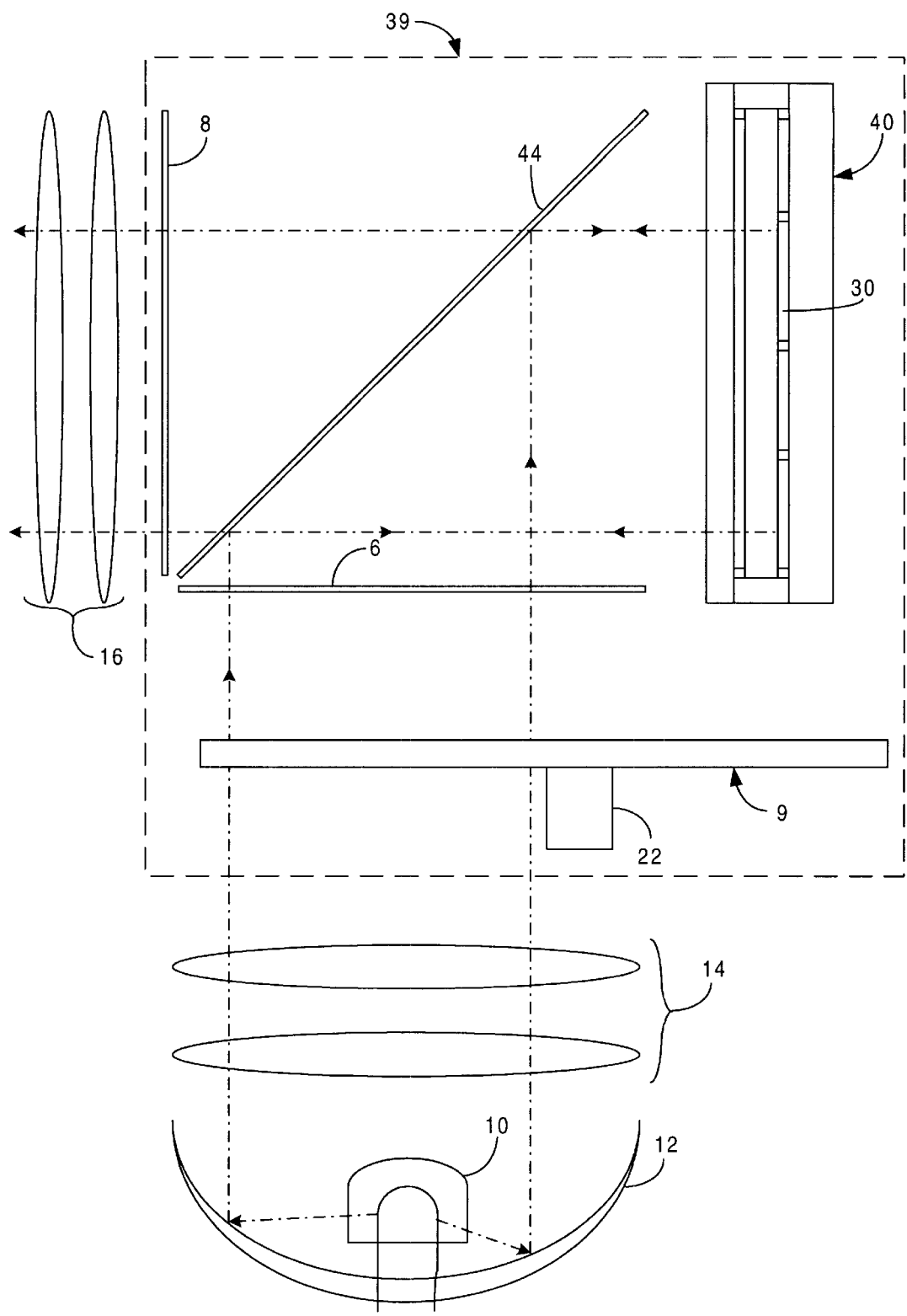
FIG. 3 is a schematic diagram of a part of a prior art display device incorporating a conventional reflective light valve system with a single spatial light modulator and a beam splitter.
Figure 13:
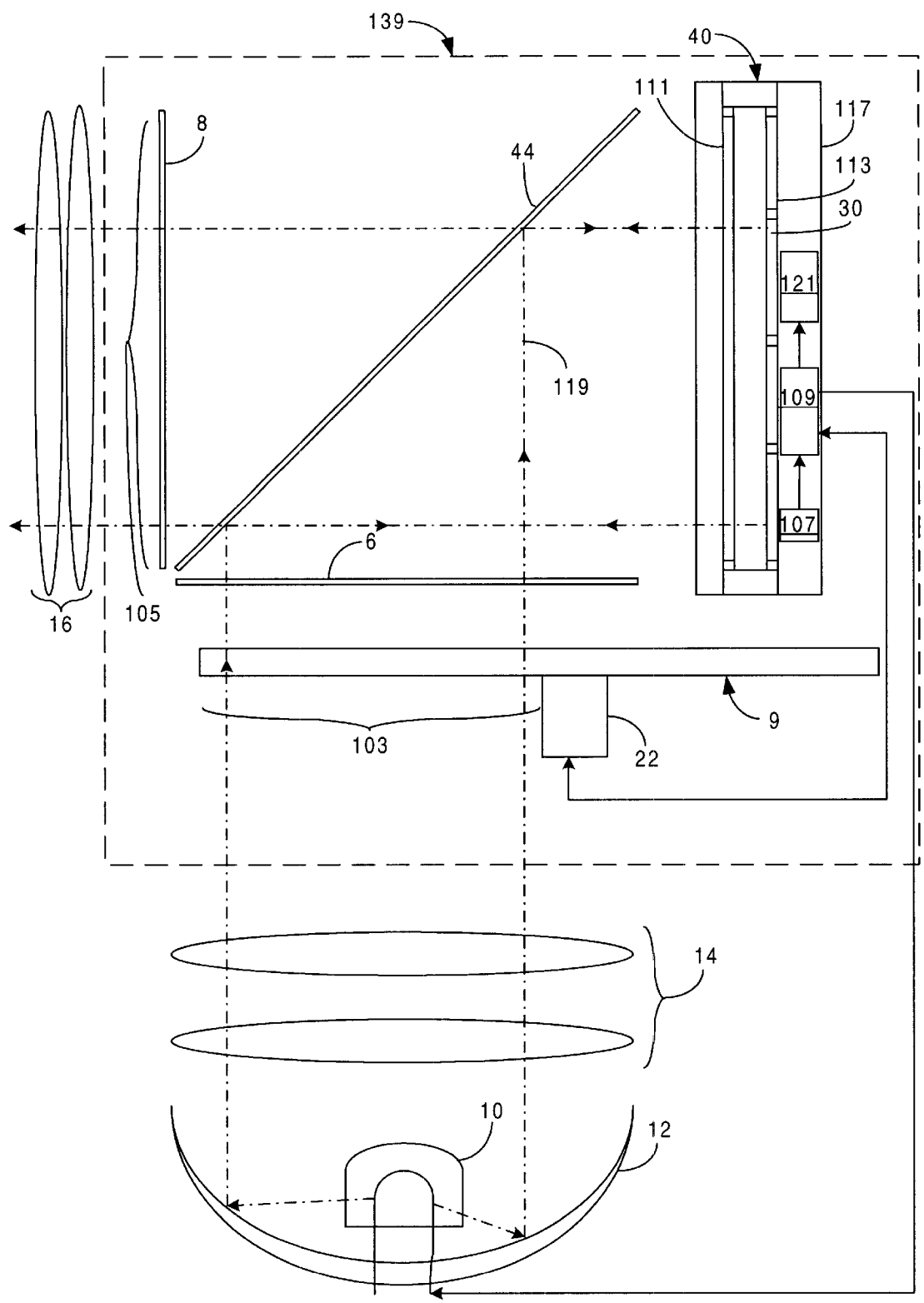
FIG. 13 is a schematic diagram of part of a display device incorporating a reflective light valve system with a single spatial light modulator, a beam splitter, and automatic color correction according to a second embodiment of the invention.

FIG. 13 depicts a variation of the second preferred embodiment of the invention 139. This variation is similar to the light valve system depicted in prior art FIG. 3 inasmuch as it includes the beam splitter 44. The beam splitter reflects the light from the light input 103 towards the spatial light modulator 40 and transmits the light reflected from the spatial light modulator towards the light output 105. The beam splitter allows for a more compact design and minimizes distortion by illuminating the spatial light modulator from an angle substantially perpendicular to the surface of the transparent electrode 111. In all other respects, it functions substantially the same as the first variation of the second preferred embodiment 139 depicted in FIG. 11 and previously described.

Figure 7:
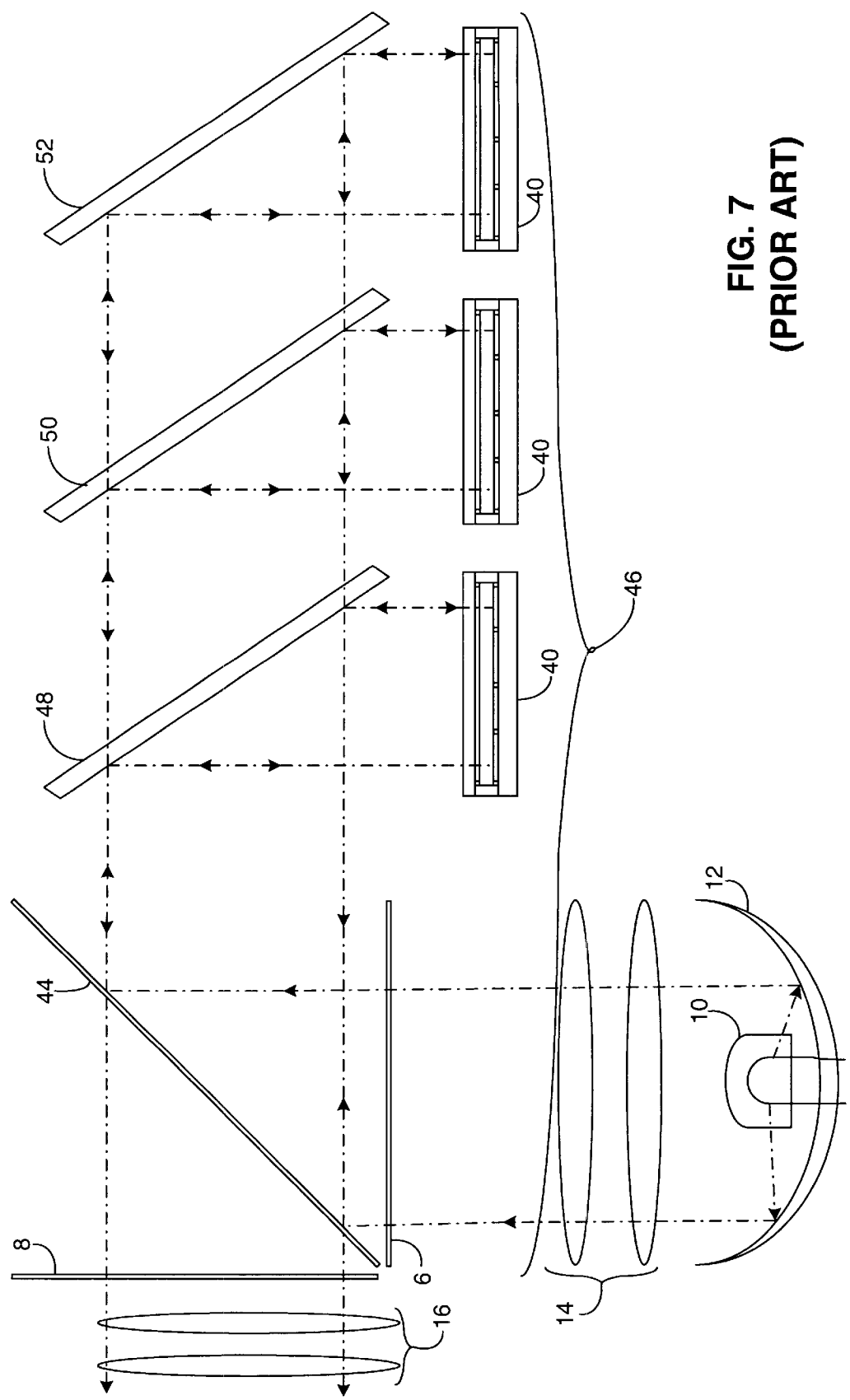
FIG. 7 is a schematic diagram of a part of a prior art display device incorporating a conventional reflective light valve system with three spatial light modulators and dichroic plates.
Figure 14:
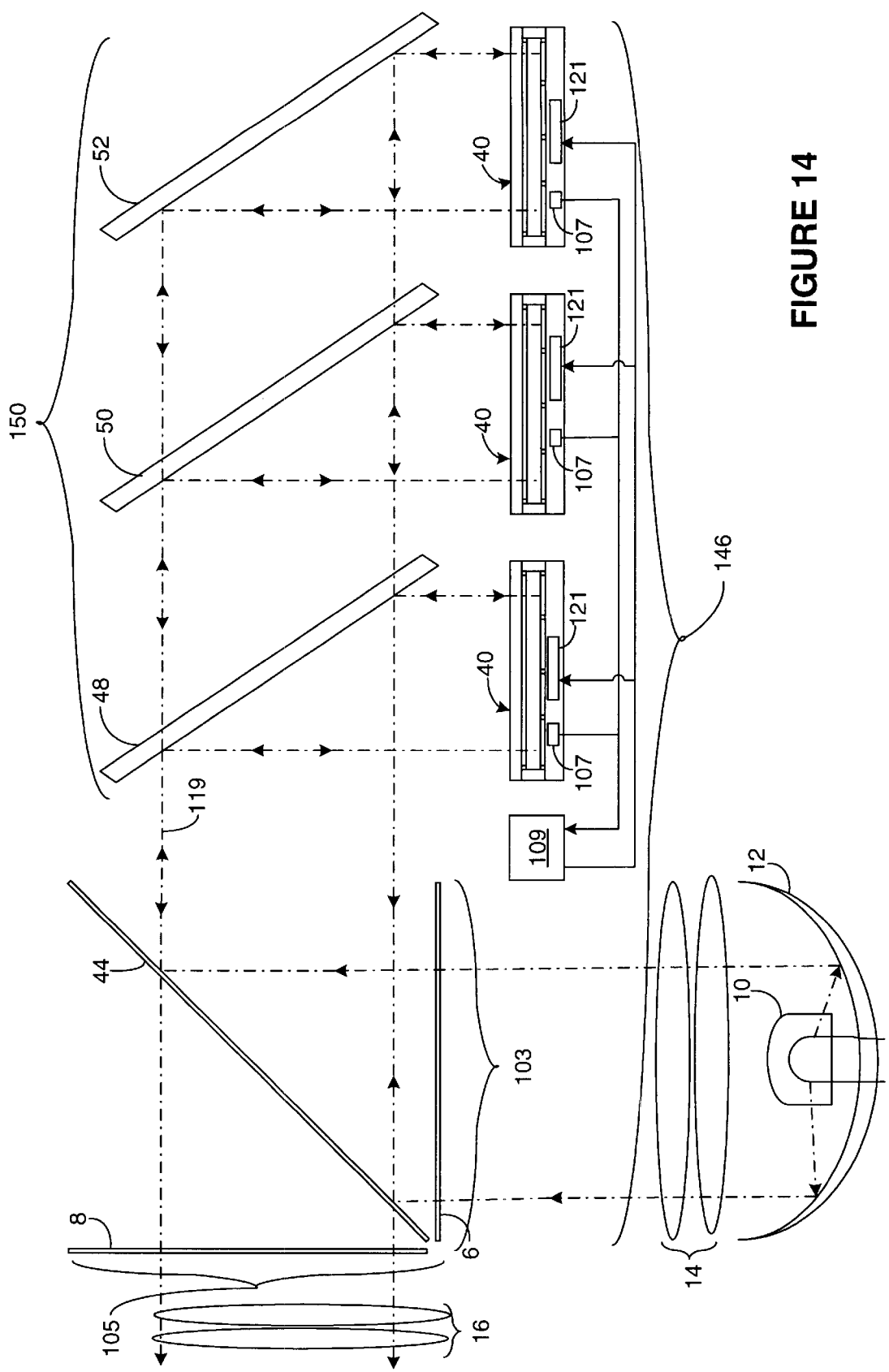
FIG. 14 is a schematic diagram of part of a display device incorporating a reflective light valve system with three spatial light modulators, three dichroic plates, and automatic color correction according to a third embodiment of the invention.

FIG. 14 is a schematic diagram showing a part of a display device incorporating a third preferred embodiment of a liquid crystal-based light valve system with automatic color balance correction according to the invention 146. This embodiment includes elements that are similar to elements shown in prior art FIG. 7. The triple spatial light modulator light valve system 146 includes a light input 103, first, second, and third reflective liquid crystal-based spatial light modulators 40, a color separator 150, a light output 105, and a first, second, and third light intensity sensor 107.

The light input 103 is the portion of the light valve system 146 through which light including a first, second, and third colorband of light is received. The color separator 150 is configured to direct the first, second and third colorband of light from the light input 103 towards the first, second, and third spatial light modulator 40, respectively. In this figure the color separator depicted is a series of three dichroic plates 48, 50, and 52. The light output 105 is the portion of the light valve system through which the first, second, and third colorband received at the light input and modulated by the first, second, and third spatial light modulator, respectively, is output. The first, second, and third light intensity sensors 107 are each located along the optical path 119 either between the color separator 150 and each of the first, second, and third spatial light modulators, respectively (not shown), or integrated into each of the first, second, and third, spatial light modulators (as shown and previously described with reference to FIG. 12). In either case, the first, second, and third light intensity sensors 107 are configured to detect the intensity of light illuminating the first, second, and third spatial light modulator 40, respectively, and are each electrically connected to the color controller 109.

A light valve system incorporating three reflective spatial light modulators 146 offers several advantages over the previously described light valve systems 102, 139 that incorporate only a single spatial light modulator. First, no complex moving parts, such as the color sequencer 9 are needed. Second, all three colors are modulated and then displayed simultaneously rather than sequentially. This eliminates some optical effects inherent to sequential color image displays which may affect the overall image quality. Lastly, each of the three spatial light modulators can be illuminated with a particular colorband of light for approximately three times longer than the single spatial light modulator can be illuminated with that colorband of light if the same full-color frame rate is desired. Assuming the same type of spatial light modulators are used in both the triple and single spatial light modulator light valve systems, the longer illumination period per color per frame give the triple spatial light modulator the ability to have three times as many "grayscale" gradients per color. Thus, the triple spatial light modulator light valve system 146 is capable of producing over twenty-seven times more color combinations at a given frame rate than a comparable single spatial light modulator light valve system 102, 139.

While the triple spatial light modulator light valve systems 146 offer many advantages over the single spatial light modulator light valve systems 102, 139, they can be more difficult to automatically color balance. This is because there is no color sequencer 9 that can be controlled, and because modulating the light source 10 simultaneously reduced the intensity of colored light illuminating all three spatial light modulators. Despite, these challenges, automatic color correction in a triple spatial light modulator light valve system 146 is possible.

The color controller 109, which is electrically connected to the first, second, and third light intensity sensors 107, first determines whether any of the first, second and third colorbands of light is not at the appropriate level for correct color balance. If one or more of the colorbands is not an appropriate level for correct color balance, the color controller then determines how the light intensity at each spatial light modulator 40 need to be adjusted in order to restore color balance. The color controller, which is also electrically connected to the control circuitry 121 of each of the first, second, and third spatial light modulator, then adjusts the modulation level of the appropriate spatial light modulators. This increases or decreases the "grayscale" level of the modulators so that the light received at the light output 105 is color balanced.

Figure 8:
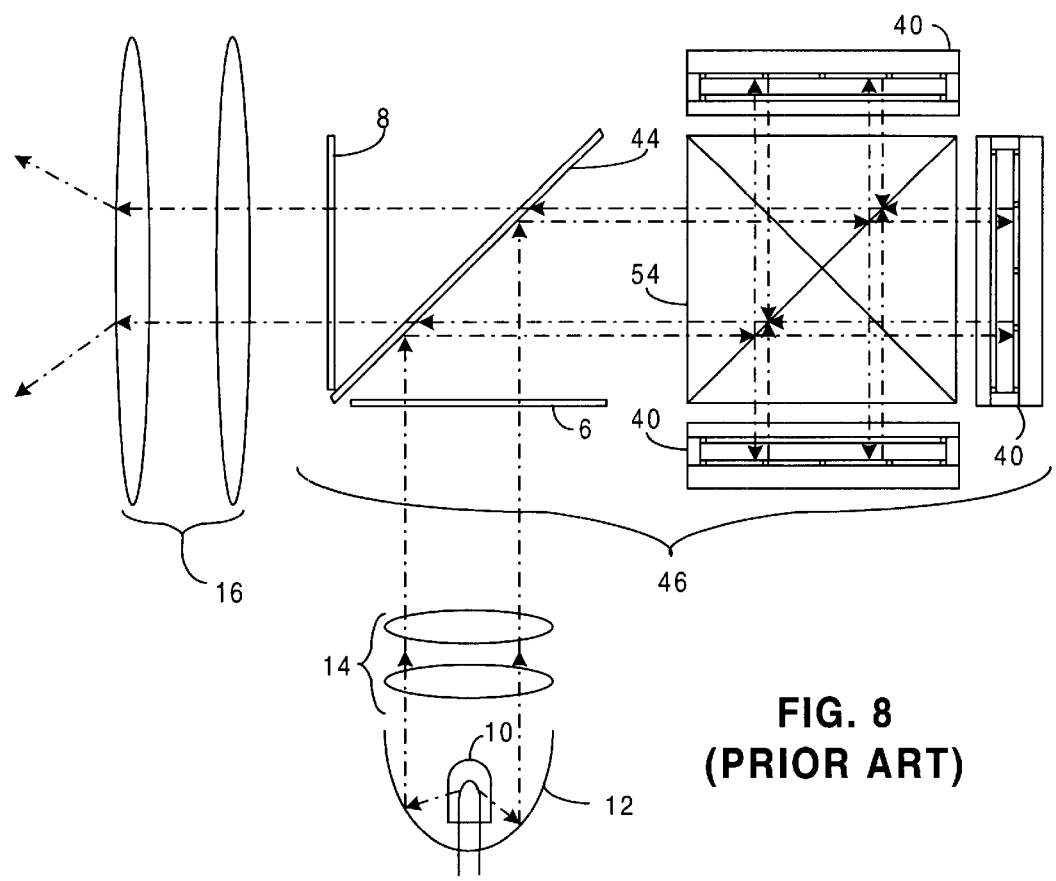
FIG. 8 is a schematic diagram of a part of a prior art display device incorporating a conventional reflective light valve system with three spatial light modulators and a color separation cube.
Figure 15:
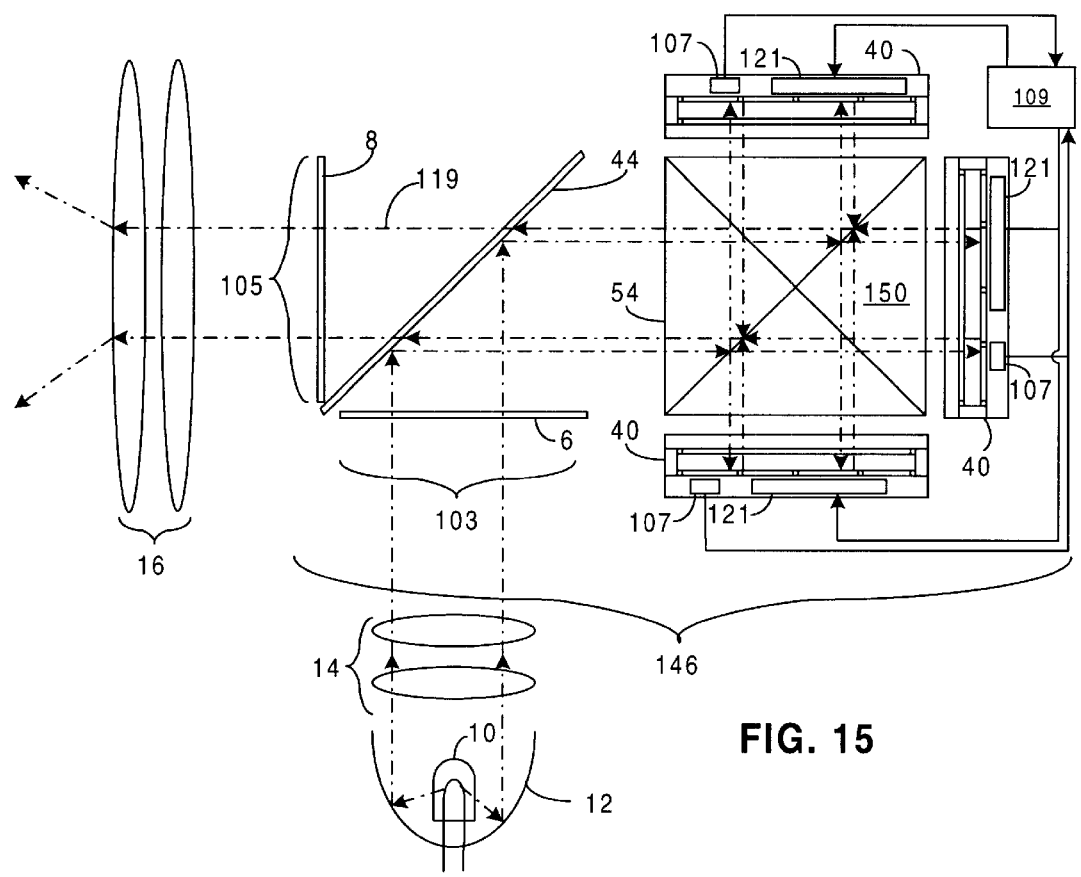
FIG. 15 is a schematic diagram of part of a display device incorporating a reflective light valve system with three spatial light modulators, a color separation cube, and automatic color correction according to a third embodiment of the invention.

FIG. 15 depicts a first variation of the third preferred embodiment of the invention 146. This variation is similar to the light valve system depicted in prior art FIG. 8 inasmuch as the color separator 150 is a color separation cube 54, sometimes known as an x-cube or crossed-dichroic cube. Otherwise this first variation functions identically to the previously described third embodiment.

Figure 9:
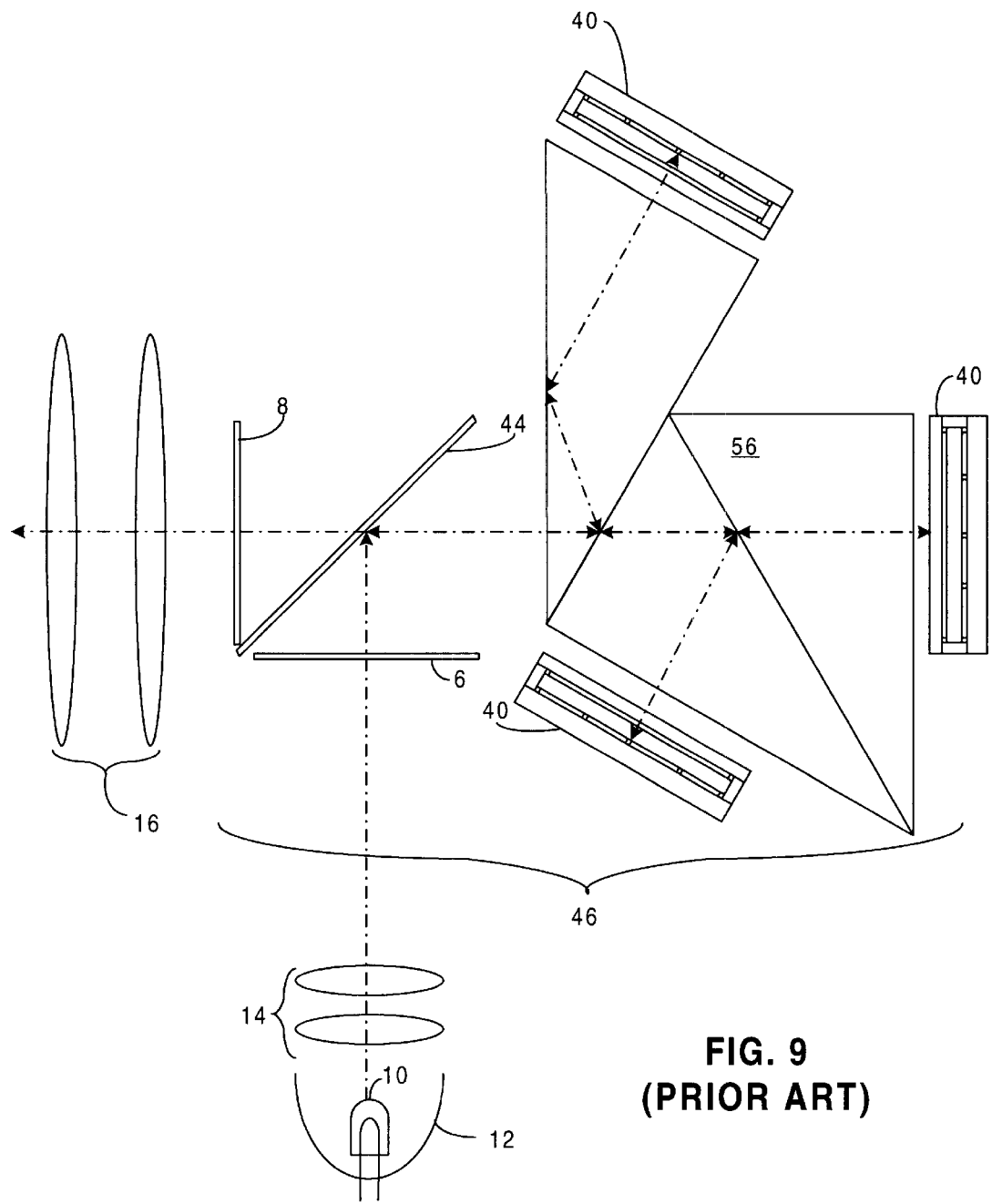
FIG. 9 is a schematic diagram of a part of a prior art display device incorporating a conventional reflective light valve system with three spatial light modulators and a three-prism color separator.
Figure 16:
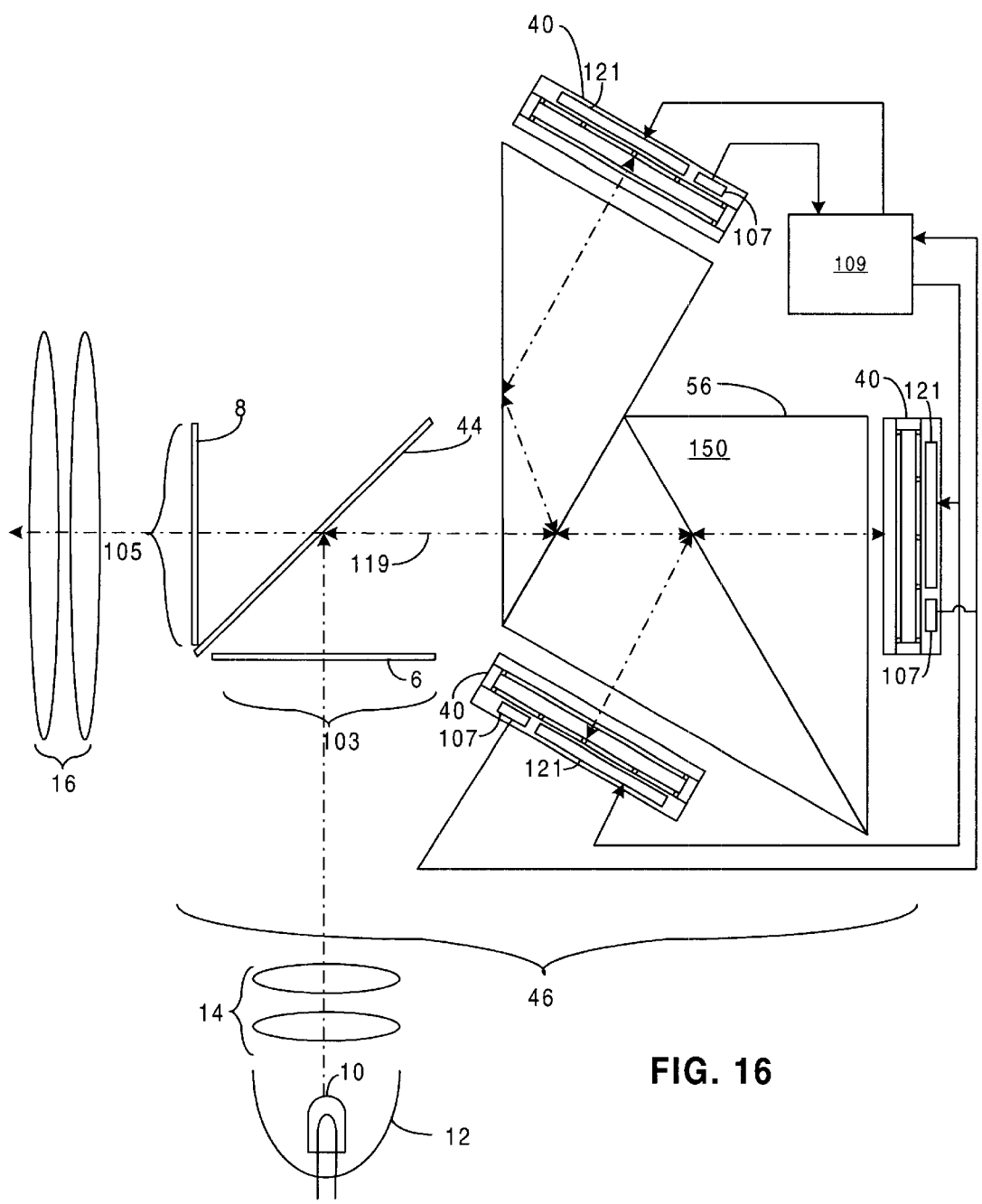
FIG. 16 is a schematic diagram of part of a display device incorporating a reflective light valve system with three spatial light modulators, a three-prism color separator, and automatic color correction according to a third embodiment of the invention.

FIG. 16 depicts a second variation of the third preferred embodiment of the invention 146. This variation is similar to the light valve system depicted in prior art FIG. 9 inasmuch as the color separator 150 is a three-prism color separator 56 (sometimes known as a Philips cube or Philips prism). Otherwise this second variation functions identically to the previously described third embodiment.

Although this disclosure describes illustrative embodiments of the invention in detail, it is to be understood that the invention is not limited to the precise embodiments described, and that various modifications may be practiced within the scope of the invention defined by the appended claims.

I claim:

1. A liquid crystal-based light valve system with automatic color correction, the light valve system comprising:
   a light input, through which light is received;
   a liquid crystal-based spatial light modulator including:
      a pixellated electrode, and
      a light intensity sensor configured to detect an intensity of light illuminating the pixellated electrode;
   a light output, through which the light received at the light input is output after modulation by the spatial light modulator; and
   a color controller electrically connected to the light intensity sensor,
   wherein the spatial light modulator additionally includes control circuitry electrically connected to the pixellated electrode and to the color controller.

2. A liquid crystal-based light valve system with automatic color correction, the light valve system comprising:
   a light input, through which light is received;
   a liquid crystal-based spatial light modulator including:
      a pixellated electrode, and
      a light intensity sensor configured to detect an intensity of light illuminating the pixellated electrode;
   a light output, through which the light received at the light input is output after modulation by the spatial light modulator;
   a color controller electrically connected to the light intensity sensor; and
   a color sequencer located along the optical path, the color sequencer including:
      a sequencer input through which the light received at the light input and including a first, a second, and a third colorband is received;
      a sequencer output through which each of the first, the second, and the third colorband sequentially pass for a first, a second, and a third duration, respectively, and
      an electrical connection to the color controller, for the color controller to control at least one of the first, the second, and the third duration.

3. The light valve system of claim 2, in which:
   the color sequencer is located on a first portion of the optical path between the light input and the spatial light modulator.

4. The light valve system of claim 2, in which:
   the color sequencer is located on a second portion of the optical path between the spatial light modulator and the light output.

5. A liquid crystal-based light valve system with automatic color correction, the light valve system comprising:
   a light input, through which light including a first, a second, and a third colorband is received;
   a first, a second, and a third liquid crystal-based spatial light modulator, each including:
      a pixellated electrode,
      control circuitry electrically connected to the pixellated electrode, and
      a light intensity sensor configured to detect an intensity of light illuminating the pixellated electrode;
   a color separator configured to direct the first, the second, and the third colorband to the first, the second, and the third spatial light modulator, respectively;
   a light output, through which the light received at the light input and modulated by one of the first, the second, and the third spatial light modulator is output; and
   a color controller electrically connected to the light intensity sensor of each of the first, the second, and the third spatial light modulator.

6. The light valve system of claim 5, in which the color controller is electrically connected to the control circuitry of each of the first, the second, and the third spatial light modulator.

7. A system comprising:
   at least one spatial light modulator;
   a sensor configuration having at least one sensor, wherein the sensor configuration is configured to detect intensities of multiple light beams, each light beam having a different set of wavelengths; and
   a color controller coupled to the sensor configuration and coupled to the spatial light modulator, wherein the color controller is configured to adjust operation of the spatial light modulator in accordance with the detected intensities.

8. The system of claim 7, wherein the color controller adjusts an illumination period of the spatial light modulator in accordance with the detected intensities.

9. The system of claim 7, further comprising a color sequencer that provides the multiple light beams in sequence to the spatial light modulator, wherein the color controller is coupled to the color sequencer and configured to control a relative duration of each light beam on the spatial light modulator.

10. The system of claim 7, further comprising a tri-colored light source, wherein the color controller is configured to modulate voltages to each element of the tri-colored light source in accordance with the detected intensities.

11. A system with automatic color correction, the system comprising:
   a spatial light modulator;
   a sensor configured to detect an intensity of light illuminating at least some portion of the spatial light modulator;
   a color controller coupled to the sensor; and a color sequencer configured to sequentially pass selective colorbands of a light beam having an optical path that encounters the sensor and the spatial modulator, wherein the colorbands are passed for corresponding durations, and wherein the color controller is configured to adjust at least one of said durations in accordance with measurements by the sensor.

* * * * *